United States Patent
Chamberlain et al.

(10) Patent No.: US 9,023,511 B1
(45) Date of Patent: May 5, 2015

(54) SYSTEMS AND METHODS FOR REMOVABLY ATTACHING A BATTERY TO A USER DEVICE

(71) Applicant: Amazon Technologies, Inc., Reno, NV (US)

(72) Inventors: Jason Conrad Chamberlain, Campbell, CA (US); Joshua Danel Lemons, San Jose, CA (US); Ryan Patrick Rafter, Burlingame, CA (US)

(73) Assignee: Amazon Technologies, Inc., Reno, NV (US)

( * ) Notice: Subject to any disclaimer, the term of this patent is extended or adjusted under 35 U.S.C. 154(b) by 247 days.

(21) Appl. No.: 13/718,690

(22) Filed: Dec. 18, 2012

(51) Int. Cl.
*H01M 2/02* (2006.01)
*H01M 2/10* (2006.01)
*B23P 11/00* (2006.01)

(52) U.S. Cl.
CPC .............. *H01M 2/1066* (2013.01); *B23P 11/00* (2013.01); *H01M 2/0202* (2013.01)

(58) Field of Classification Search
CPC ........................................ H01M 2/02–2/0297
USPC .................................. 429/163–187
See application file for complete search history.

(56) References Cited

U.S. PATENT DOCUMENTS

| | | | | |
|---|---|---|---|---|
| 5,654,111 | A * | 8/1997 | Minomiya et al. | 429/162 |
| 2004/0047135 | A1* | 3/2004 | Bando | 361/748 |
| 2005/0263577 | A1* | 12/2005 | Walsh et al. | 229/164.2 |
| 2009/0274953 | A1* | 11/2009 | Myers et al. | 429/100 |
| 2011/0255850 | A1* | 10/2011 | Dinh et al. | 396/176 |
| 2012/0081808 | A1* | 4/2012 | Nagai et al. | 359/871 |
| 2013/0222198 | A1* | 8/2013 | Kojima | 343/788 |
| 2014/0311645 | A1* | 10/2014 | James | 152/511 |

* cited by examiner

*Primary Examiner* — Ula C Ruddock
*Assistant Examiner* — Scott J Chmielecki
(74) *Attorney, Agent, or Firm* — Sutherland Asbill & Brennan LLP (57) ABSTRACT

System, methods, and apparatuses for removably attaching a battery to a user device are provided herein. In certain embodiments, a system may include an adhesive layer formed on an inner portion of the user device. The system may also include a battery retention label. The battery retention label may include a body portion configured to be adhered to the inner portion of the user device by the adhesive layer. The body portion may be configured to receive the battery thereon. The battery retention label may also include one or more tabs extending from the body portion. Each of the one or more tabs may include a battery adhesive layer formed on one side thereof. Moreover, each of the one or more tabs may be folded over the battery so that the battery adhesive layer adheres to the battery and retains the battery within the battery retention label.

27 Claims, 8 Drawing Sheets

SYSTEMS AND METHODS FOR REMOVABLY ATTACHING A BATTERY TO A USER DEVICE

BACKGROUND

The rise in the popularity and use of user devices, such as tablets, smartphones, and e-readers, has led to significant improvements in the size and cost of these devices. The ever-decreasing size of these devices provides increased mobility and usability; however, as these devices get smaller, space becomes a premium for their various internal components. Moreover, batteries (such as soft cell batteries) need to be protected to prevent damage during handling and drop testing. Typically, this is resolved by adding a plastic or metal frame around the battery, which takes up a substantial amount of space, or by adhering the battery directly to an existing part of the user device, which makes the battery difficult to remove or rework.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals may indicate similar or identical items. Various embodiments may utilize elements and/or components other than those illustrated in the drawings, and some elements and/or components may not be present in various embodiments. Throughout this disclosure, depending on the context, singular and plural terminology may be used interchangeably.

DETAILED DESCRIPTION

Overview

User devices, such as mobile tablets and smartphones, have increased the speed and efficiency with which information is communicated and disseminated. By virtue of the pervasive mobile connectivity of such user devices, restrictions on the time and location of information sharing have largely been eliminated. However, as user devices become thinner and lighter, they tend to provide limited space for their various internal components. In particular, the sleek profile of many user devices provides limited internal space for the secure attachment of a battery. Accordingly, a battery retention label for removably attaching a battery to a user device is disclosed herein. The battery retention label utilizes the limited internal space of the user device to provide a secure and workable attachment thereto. That is, the battery retention label secures the battery within the user device, while also enabling the battery to be easily removed from the user device, which saves time and money if the user device is returned for repairs. The battery retention label disclosed herein also provides numerous other advantages relating to being able to form a removable connection within the user device in various ways.

In some instances, the battery retention label may secure a battery within a user device. That is, the battery retention label may be affixed to an inner portion of the user device, and a battery may be removably secured to the battery retention label. For example, an adhesive layer may be formed on an inner portion of the user device, and the battery retention label may be adhered to the inner portion of the user device by the adhesive layer. Alternatively, the adhesive layer may be formed on the battery retention label instead of or in addition to the inner portion of the user device. In either instance, the battery retention label may be adhered to the inner portion of the user device by the adhesive layer.

In certain embodiments, the battery retention label may include a body portion that is affixed to the inner portion of the user device by the adhesive layer. As noted above, the adhesive layer may be formed on the inner portion of the user device and/or on the body portion of the battery retention label. The body portion may be configured to receive a battery thereon. For example, the battery may be placed or positioned on or about the body portion. The body portion may form a layer (or barrier) between the adhesive layer and the battery. Thus, the battery may not be directly affixed to the inner portion of the user device. The battery retention label may also include one or more tabs extending from the body portion. The tabs may include a battery adhesive layer formed on at least one side of the tabs. To secure the battery within the battery retention label, the tabs may be folded over the battery opposite the body portion so that the battery adhesive layer adheres to the battery and/or the other tabs and retains the battery within the battery retention label. In this manner, the battery may be retained within the battery retention label, which in turn may be affixed to the inner portion of the user device.

As noted above, the battery retention label may provide a secure and workable attachment such that the battery may be easily removed from the battery retention label. Accordingly, in some instances, the battery adhesive layer on each of the tabs may comprise a greater resistance to a shear force than to a tension force. That is, the battery adhesive layer on each of the tabs may be strong in shear but relatively weak in tension. An example adhesive having such properties may include, but is not limited to, TESA® 4972 0.05 mm or the like. Any acrylic, polymer, synthetic, epoxy, etc., or otherwise may also be used. Such a configuration may secure and protect the battery within the battery retention label in response to the various movements (such as a drop) experienced during the use and/or testing of the user device. Such a configuration also enables the tabs to be easily removed when pulled on during manufacturing, reconditioning, and/or repair of the user device. Accordingly, the battery is secured during use and testing of the user device and can also be easily removed, which saves time and money if the user device is returned for repair.

In some instances, a peelable protective cover may be positioned in overlying relation to the adhesive layer on the inner portion of the user device and/or on the body portion of the battery retention label. The peelable protective cover may be removed from the adhesive layer, and the battery retention label may be adhered to the inner portion of the user device. Similarly, a peelable protective cover may be positioned in overlying relation to the battery adhesive layer on each of the tabs. The peelable protective cover may be removed from each of the tabs to expose the battery adhesive layer. The tabs may then be folded over the battery opposite the body portion, thereby adhering the tabs to the battery and/or the other tabs and retaining the battery within the battery retention label.

In certain embodiments, the battery retention label may include a means for aligning the battery retention label within the user device. Aligning the battery retention label within the user device may ensure that the battery is properly positioned within the user device and capable of being connected to the appropriate hardware within the user device. For example, the body portion of the battery retention label may include one or more alignment holes or cutouts. Similarly, the inner portion of the user device may include one or more corresponding projections configured to mate with the alignment holes or cutouts. Other types of alignment devices may also be used herein. Furthermore, any number of tools may be used in conjunction with the alignment devices to facilitate the proper alignment of the battery retention label within the user device.

In some aspects, the tabs of the battery retention label may each include a pull tab or the like. The pull tab may facilitate the removal of the tabs from the battery after the tabs have been adhered to the battery and/or the other tabs. The pull tab may be a separate component of each tab or integral with each tab. For example, a portion (such as a corner) of each tab that abuts the battery may not include the battery adhesive layer and therefore may form a flap that may be at least partially peeled back and used to pull the rest of the tab off of the battery. Further, each of the pull tabs may include indicia indicating their purpose and use. For example, the pull tabs may include a phrase or symbol indicating "pull here" or the like.

These and other embodiments of the disclosure will be described in more detail through reference to the accompanying drawings in the detailed description that follows. This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

Figure 1:
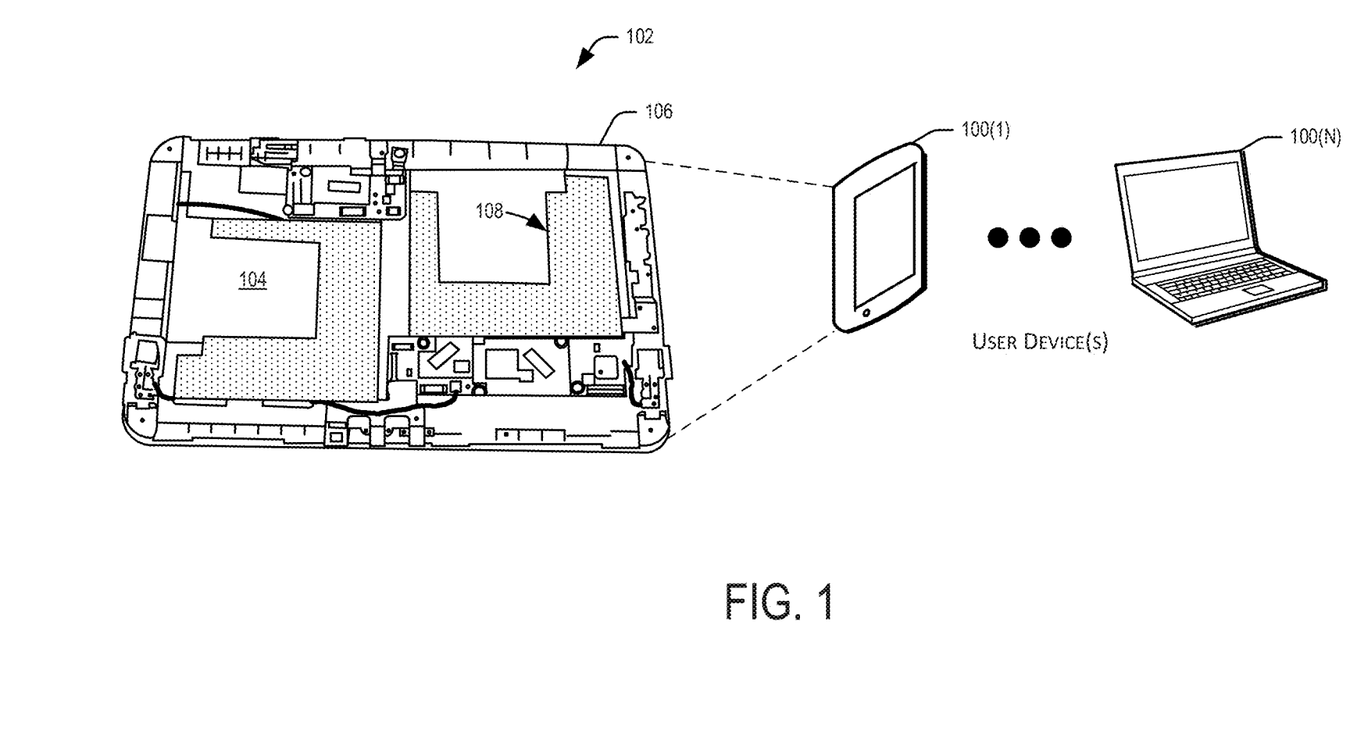
FIG. 1 schematically depicts an upper view of a battery retention system in accordance with one or more embodiments of the disclosure.

FIGS. 1-10 schematically depict an example sequence, which is not necessarily in order, for removably attaching a battery to a user device in accordance with one or more embodiments of the disclosure. Specifically, FIG. 1 schematically depicts an inner portion 102 of a user device 100. By way of example, the user device 100 may be any number of user devices, such as, but not limited to, tablets, smartphones, laptops, e-readers, or the like. The inner portion 102 of the user device 100 may be any internal surface or structure of the user device 100. For example, the inner portion 102 of the user device 100 may comprise an inner surface 104 of a back cover (or casing) 106 of the user device 100. In some instances, the inner portion 102 of the user device 100 may include a number of electronic components (such as circuitry, connectors, other hardware, etc.) and/or structures (such as frames, housings, etc.) for securing said electronic components to the inner surface 104 of the back cover 106 of the user device 100.

In some examples, the inner portion 102 of the user device 100 may include an adhesive layer 108. The adhesive layer 108 may be formed on all or some of the inner portion 102 of the user device 100. For example, the adhesive layer 108 may be formed on the inner surface 104 of the back cover 106 of the user device 100. The adhesive layer 108 may be disposed on the inner surface 104 in any number of configurations. That is, the adhesive layer 108 may be disposed on the inner surface 104 so as to surround other components attached to the inner surface 104, such as the electronic components discussed above. In some instances, the adhesive layer 108 may be formed on the battery retention label instead of or in addition to the inner portion 102 of the user device 100. In either instance, the battery retention label may be adhered to the inner portion 102 of the user device 100 by the adhesive layer 108. The thickness and/or area covered by the adhesive layer 108 may vary depending on the properties (e.g., strength) of the adhesive layer 108. Any adhesive known in the art or otherwise may be used herein. Example adhesives may include, but are not limited to, TESA® 4972 0.05 mm or the like.

Figure 2:
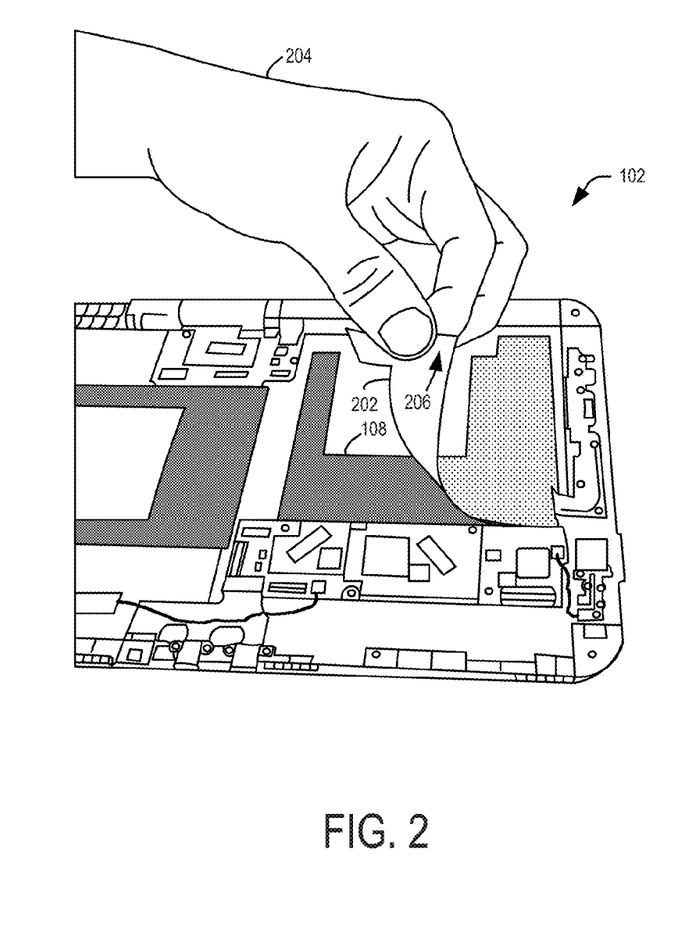
FIG. 2 schematically depicts an upper view of a battery retention system in accordance with one or more embodiments of the disclosure.

FIG. 2 schematically depicts the inner portion 102 of the user device 100 in accordance with an embodiment of the disclosure. In some instances, a peelable protective cover 202 may be positioned in overlying relation to the adhesive layer 108. The peelable protective cover 202 may prevent dust, loose parts, or other objects from inadvertently adhering to the adhesive layer 108. Any peelable protective cover, layer, sheet, etc., known in the art or otherwise, may be used herein. As its name implies, the peelable protective cover 202 may be removed (i.e., peeled away) from the adhesive layer 108 to expose the adhesive layer 108. For example, the user 204 may grasp a portion of the peelable protective cover 202 and peel the peelable protective cover 202 away from the adhesive layer 108. In some instances, a pull tab (such as a corner flap 206) may be associated with the peelable protective cover 202 to further facilitate the user 204 removing the peelable protective cover 202 from the adhesive layer 108. For example, the corner flap 206 may comprise a corner portion of the peelable protective cover 202 that extends beyond the adhesive layer 108. Any pull tab known in the art or otherwise may be associated with the peelable protective cover 202 to facilitate removal thereof. In some instances, the peelable protective cover 202 may include indicia (such as "pull here" or the like) indicating how to remove the peelable protective cover 202 from the adhesive layer 108.

Figure 3:
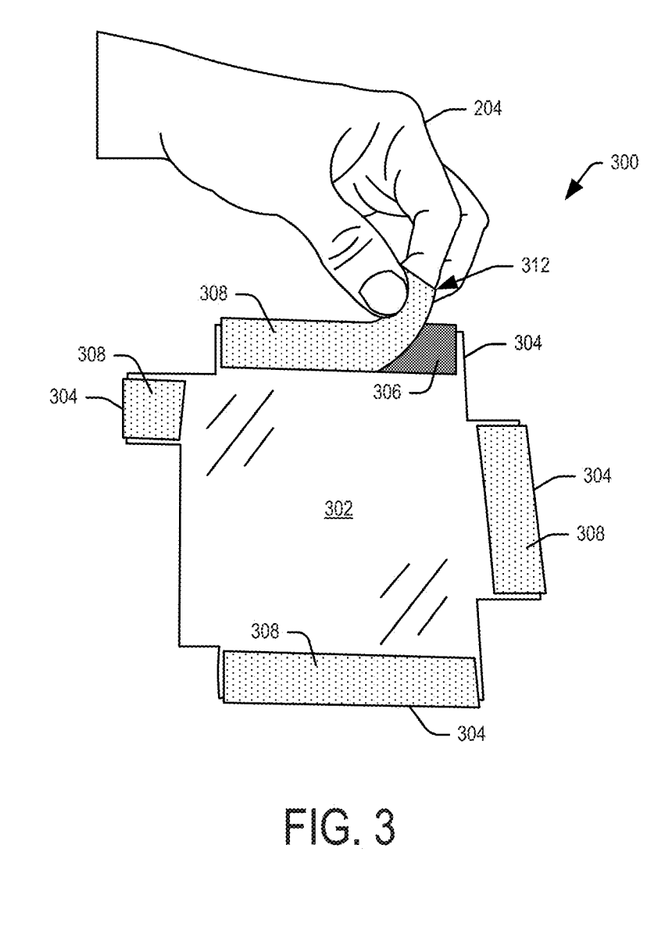
FIG. 3 schematically depicts an upper view of a battery retention system in accordance with one or more embodiments of the disclosure.

FIG. 3 schematically depicts a battery retention label 300 in accordance with an embodiment of the disclosure. In certain embodiments, the battery retention label 300 may include a body portion 302. Although not required, the size and shape of the body portion 302 may at least partially correspond to the size and shape of the adhesive layer 108 on the inner surface 104 of the back cover 106 of the user device 100. In this manner, the body portion 302 may be affixed to the inner portion 102 of the user device 100 by the adhesive layer 108. In some instances, the adhesive layer 108 may be formed on the inner portion 102 of the user device 100 and/or on the body portion 302 of the battery retention label 300. In certain aspects, the body portion 302 opposite the adhesive layer 108 may be configured to receive a battery thereon, i.e., a battery may be positioned on or about the body portion 302 after it has been adhered to the inner portion 102 of the user device 100. The body portion 302 may form a layer (or barrier) between the adhesive layer 108 and a battery. In some instances, the body portion 302 may comprise a thin sheet of material or the like. As depicted in FIG. 3, the body portion 302 is generally rectangular in shape, although other shapes are possible, such as triangular, U-shaped, circular, etc.

In certain embodiments, the battery retention label 300 may also include one or more tabs 304 extending from the body portion 302. The tabs 304 may extend from some or all sides of the body portion 302. In some instances, the tabs 304 may comprise one continuous tab 304 about the periphery of the body portion 302. As depicted in FIG. 3, the battery retention label 300 may include four tabs 304, with at least one tab 304 extending from each side of the rectangular body portion 302. However, any number of tabs may be used herein to secure a battery to the battery retention label 300. Moreover, the tabs 304 may extend from the body portion 302 at any location necessary to secure a battery to the battery retention label 300. Accordingly, certain sides of the body portion 302 may have more tabs 304 than others, or no tabs 304 at all. Further, as depicted in FIG. 3, the tabs 304 may be generally rectangular in shape, although other shapes are possible, such as triangular, hexagon, etc. Moreover, in some embodiments, the tabs 304 may comprise a thin sheet of material or the like. For example, the tabs 304 may be formed of the same or different material than the body portion 302. In some instances, the body portion 302 of the retention label 300 may be omitted, and the tabs 304 may be directly adhered to the inner portion 102 of the user device 100 by the adhesive layer 108.

In some instances, the tabs 304 may include a battery adhesive layer 306 formed on at least one side of the tabs 304. The battery adhesive layer 306 may be formed on all or part of the tabs 304. The battery adhesive layer 306 may be disposed on the tabs 304 in any number of configurations. For example, the thickness and/or area covered by the battery adhesive layer 306 may vary depending on the properties (e.g., strength) of the battery adhesive layer 306. Any adhesive known in the art or otherwise may be used herein. The battery adhesive layer 306 is discussed in greater detail below.

In certain aspects, a peelable protective cover 308 may be positioned in overlying relation to the battery adhesive layer 306. The peelable protective cover 308 may prevent dust, loose parts, or other objects from inadvertently adhering to the battery adhesive layer 306. Any peelable protective cover, layer, sheet, etc., known in the art or otherwise, may be used herein. As its name implies, the peelable protective cover 308 may be removed (i.e., peeled away) from the battery adhesive layer 306 so as to expose the battery adhesive layer 306 thereunder. For example, the user 204 may grasp a portion of the peelable protective cover 308 and peel the peelable protective cover 308 away from the battery adhesive layer 306 of the tabs 304. In some instances, a pull tab (such as a corner flap 312) may be associated with the peelable protective cover 308 to further facilitate the user 204 removing the peelable protective cover 308 from the battery adhesive layer 306. For example, the corner flap 312 may comprise a corner portion of the peelable protective cover 308 that extends beyond the battery adhesive layer 306. Any pull tab known in the art may be associated with the peelable protective cover 308. Moreover, the peelable protective cover 308 may include indicia (such as "pull here" or the like) indicating how to remove the peelable protective cover 308 from the battery adhesive layer 306.

Figure 4:
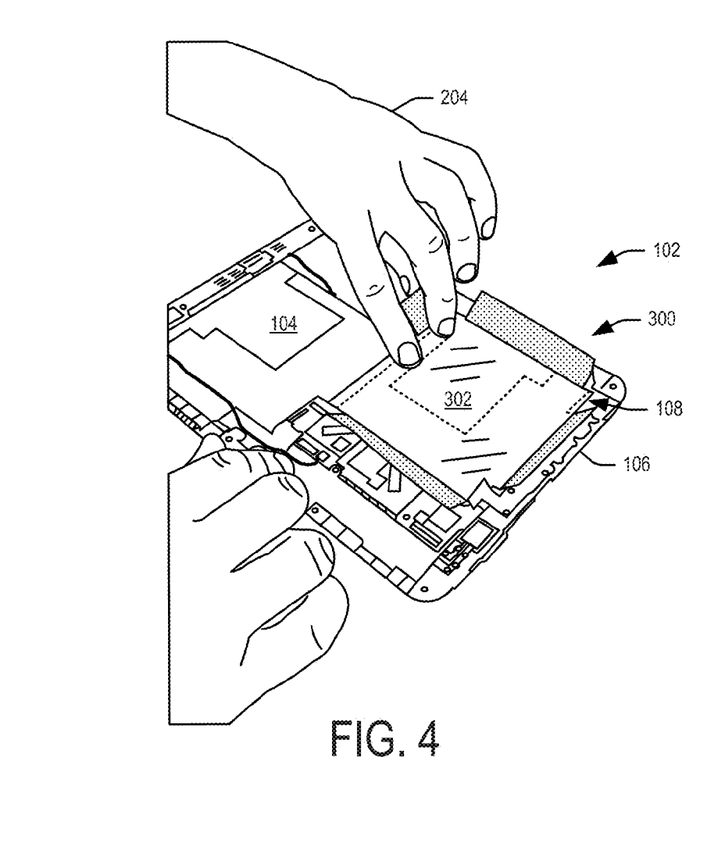
FIG. 4 schematically depicts an upper view of a battery retention system in accordance with one or more embodiments of the disclosure.
Figure 5:
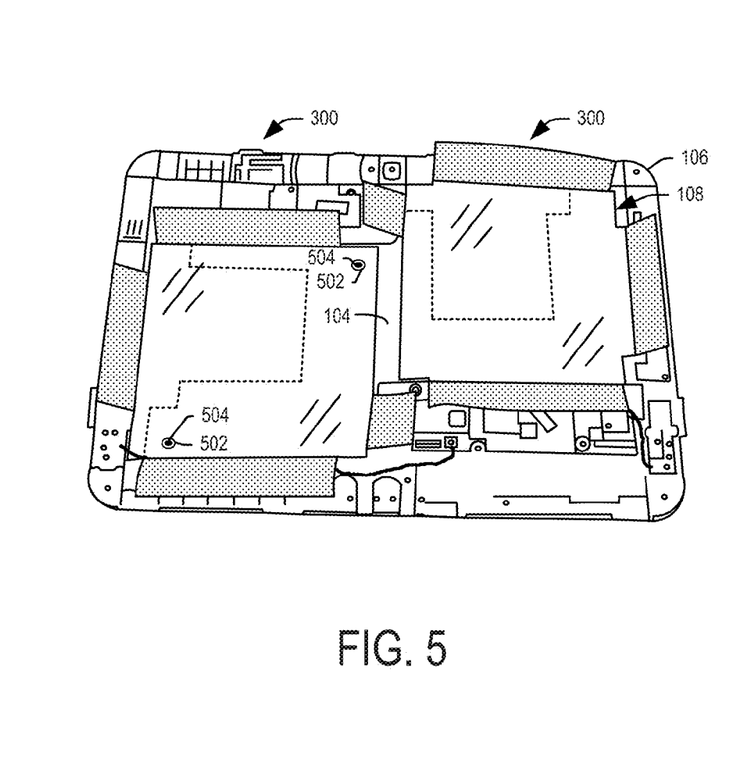
FIG. 5 schematically depicts an upper view of a battery retention system in accordance with one or more embodiments of the disclosure.

FIGS. 4 and 5 schematically depict the battery retention label 300 affixed to the inner portion 102 of the user device 100 in accordance with an embodiment of the disclosure. That is, in some instances, the battery retention label 300 may be adhered to the inner portion 102 of the user device 100 by the adhesive layer 108. For example, the body portion 302 of the battery retention label 300 may be adhered by the adhesive layer 108 to the inner surface 104 of the back cover 106 of the user device 100. In certain embodiments, as discussed above with reference to FIG. 2, the peelable protective cover 202 of the adhesive layer 108 may be peeled away to expose the adhesive layer 108 thereunder. The body portion 302 of the battery retention label 300 may then be aligned with the adhesive layer 108 and adhered thereto. For example, the user 204 may position the body portion 302 of the battery retention label 300 over the adhesive layer 108 and press the body portion 302 of the battery retention label 300 against the adhesive layer 108, thereby securing the battery retention label 300 to the inner surface 104 of the back cover 106 via the body portion 302. As depicted in FIG. 5, one or more battery retention labels 300 may be adhered to the inner surface 104 of the back cover 106 of the user device 100. That is, depending on the number of batteries to be secured within the user device 100, more than one battery retention label 300 may be adhered to the inner surface 104 of the back cover 106 by one or more corresponding adhesive layers 108.

In some instances, the body portion 302 of the battery retention label 300 and/or the inner portion 102 of the user device 100 may include a means for aligning the battery retention label 300 on the inner surface 104 of the back cover 106 of the user device 100. For example, the body portion 302 of the battery retention label 300 may include one or more alignment holes or cutouts 502. Similarly, the inner portion 102 of the user device 100 may include one or more corresponding projections 504 (or bumps) configured to mate with the alignment holes or cutouts 502. Such a configuration may ensure that the battery retention label 300 is properly aligned within the user device 100. In certain embodiments, the one or more alignment holes or cutouts 502 and the one or more corresponding projections 504 may be positioned about the body portion 302 of the battery retention label 300 so as not to interfere with the tolerances of the battery placed thereon. That is, the one or more alignment holes or cutouts 502 and the one or more corresponding projections 504 may be positioned beneath the battery and/or adjacent thereto. Other types of alignment devices may also be used herein. For example, the inner surface 104 of the back cover 106 may be configured to encourage the body portion 302 of the retention label 300 to nest in a specific orientation and/or at a specific location within the inner portion 102 of the user device 100. Moreover, corresponding indicia on the battery retention label 300 and/or the inner surface 104 of the back cover 106 may indicate a correct placement and orientation of the battery retention label 300. Furthermore, any number of tools may be used in conjunction with the alignment devices to facilitate the proper alignment of the battery retention label 300 within the user device 100.

Figure 6:
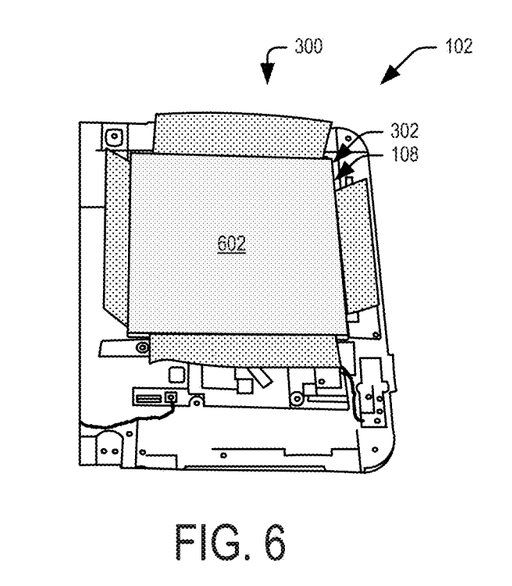
FIG. 6 schematically depicts an upper view of a battery retention system in accordance with one or more embodiments of the disclosure.
Figure 7:
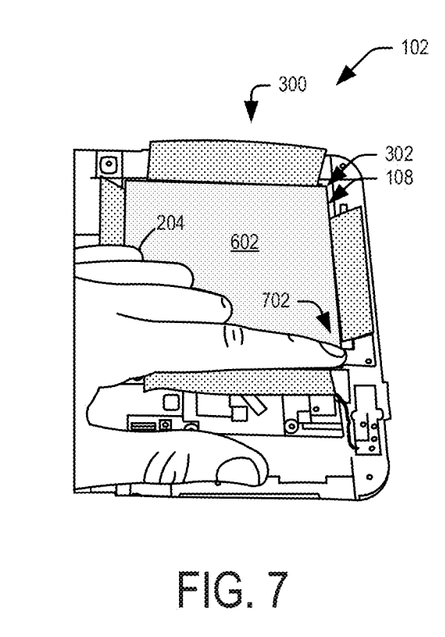
FIG. 7 schematically depicts an upper view of a battery retention system in accordance with one or more embodiments of the disclosure.

As depicted in FIG. 6, the body portion 302 of the battery retention label 300 may be configured to receive a battery 602 thereon. That is, the battery 602 may be positioned on or about the body portion 302 after the body portion 302 has been adhered to the inner portion 102 of the user device 100 by the adhesive layer 108. In this manner, the body portion 302 may form a layer (or barrier) between the adhesive layer 108 and the battery 602. That is, the battery 602 may not be adhered directly to the inner surface 104 of the user device 100. This enables the battery 602 to be positioned (and/or repositioned) within the user device 100 without being initially adhered to the user device 100. In particular, this enables a user to adjust the position of the battery 602 to ensure that the battery meets the tolerances required to make the various electrical connections within the user device 100. For instance, as depicted in FIG. 7, after the battery 602 has been positioned on the body portion 302 of the battery retention label 300, the user 204 may connect the battery 602 to the circuitry 702 of the user device 100 by way of, for example, a board-to-board connector or the like. One will appreciate that any electro-mechanical connector (such as male/female terminals, plugs, ports, adaptors, etc.) may be used herein. Because the battery 602 is not yet fastened within the user device 100 when the battery 602 is connected to the circuitry 702, the battery 602 is capable of self-adjusting its position about the battery retention label 300 so that it is in the proper position and within acceptable tolerances to form a lasting connection with the circuitry 702.

Figure 8:
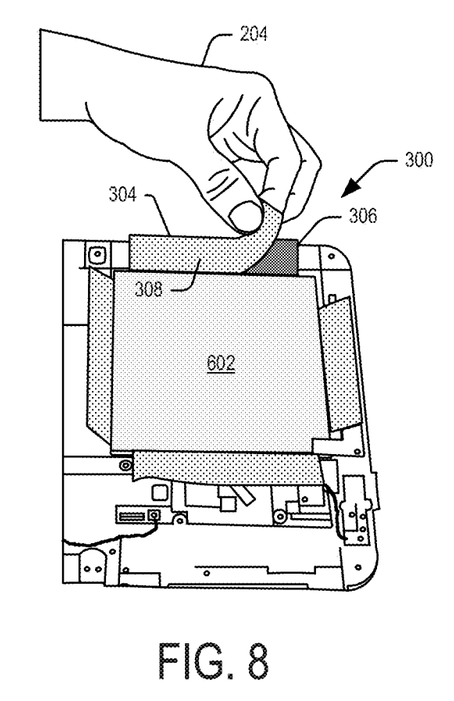
FIG. 8 schematically depicts an upper view of a battery retention system in accordance with one or more embodiments of the disclosure.
Figure 9:
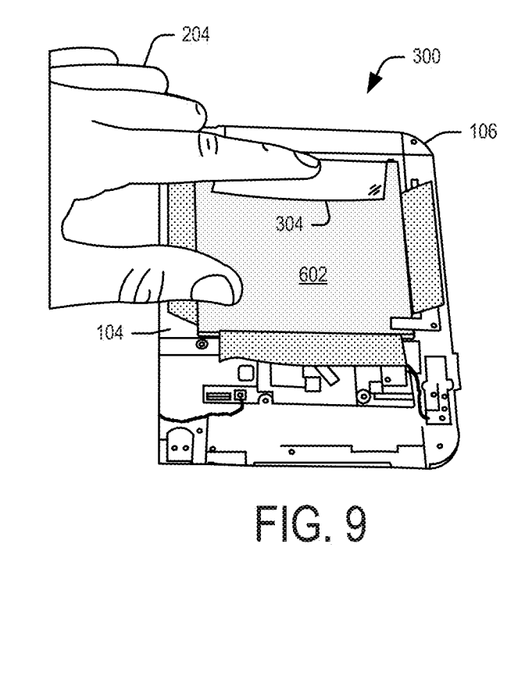
FIG. 9 schematically depicts an upper view of a battery retention system in accordance with one or more embodiments of the disclosure.
Figure 10:
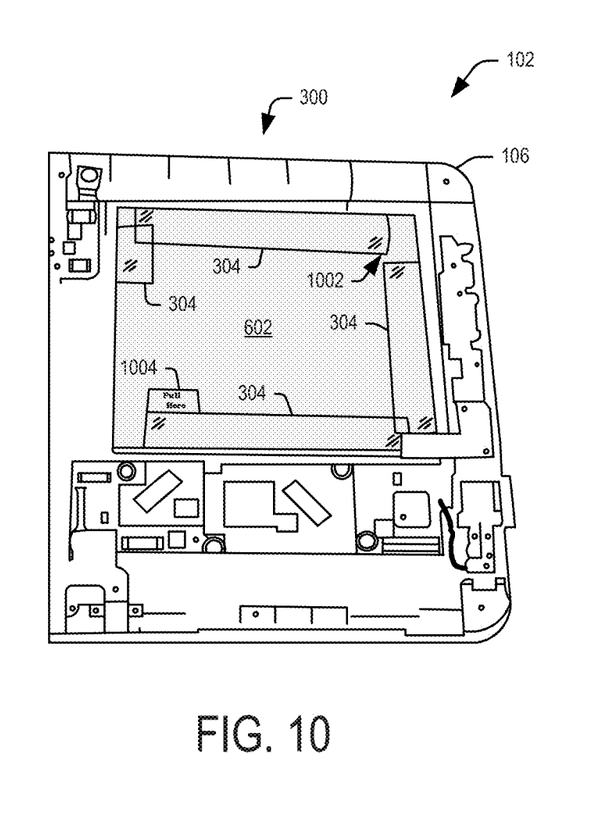
FIG. 10 schematically depicts an upper view of a battery retention system in accordance with one or more embodiments of the disclosure.

FIGS. 8-10 schematically depict the battery 602 being affixed to the battery retention label 300 in accordance with an embodiment of the disclosure. In certain embodiments, to secure the battery 602 within the battery retention label 300, the peelable protective cover 308 may be removed (i.e., peeled away) from the battery adhesive layer 306 so as to expose the battery adhesive layer 306 thereunder. For example, as depicted in FIG. 8, the user 204 may grasp a portion of the peelable protective cover 308 and peel the peelable protective cover 308 away from the battery adhesive layer 306 of the tabs 304.

In certain embodiments, once the battery adhesive layer 306 of the tabs 304 is exposed, the tabs 304 may be folded over the battery 602 opposite the body portion 302 so that the battery adhesive layer 306 adheres to the outer surface of the battery 602. For example, as depicted in FIG. 9, the user 204 may grasp a portion of the tabs 304 and fold the tabs 304 over the battery 602 so that the surface of the tabs 304 that includes the battery adhesive layer 306 is positioned adjacent to the outer surface of the battery 602. In other instances, the tabs 304 may be folded over one another so that the surface of the tabs 304 that includes the battery adhesive layer 306 is positioned adjacent to the surface of the adjacent tab 304 that does not include the battery adhesive layer 306. That is, the tabs 304 may be folded over one another in overlying relation. The user 204 may then press the tabs 304 against the battery 602 and/or the other tabs 304. As a result, the tabs 304 may be adhered to the battery 602 and/or the other tabs 304. In this manner, the battery 602 may be retained within the battery retention label 300, which in turn may be affixed to the inner surface 104 of the back cover 106 of the user device 100.

As noted above, the battery retention label 300 may provide a secure and workable attachment such that the battery 602 may be easily removed from the battery retention label 300. For example, as depicted in FIG. 10, the tabs 304 may be folded over the battery 602 so that the surface of the tabs 304 that includes the battery adhesive layer 306 is adhered to the battery 602. Also noted above, in some instances, the battery adhesive layer 306 on each of the tabs 304 may comprise a greater resistance to a shear force than to a tension force. That is, the battery adhesive layer 306 on each of the tabs 304 may be strong in shear but relatively weak in tension. An example adhesive having such properties may include, but is not limited to, TESA® 4972 0.05 mm or the like. Accordingly, in some instances, the tabs 304 may be removed from the battery 602 by the application of a tensile force. For example, the user 204 may grasp a portion of the tabs 304, such as a corner flap 1002, and apply a tensile force to lift (or peel) the tabs 304 away from the battery 602. The corner flap 1002 may comprise a corner portion of the tab 304 adjacent to the battery adhesive layer 306 that is void of the battery adhesive layer 306, thereby enabling the user 204 to grasp the corner flap 1002. Other types of pull tabs, such as a pull tab 1004 or the like, may be associated with the tabs 304 for the removal of the tabs 304 from the battery 602. Moreover, the tabs 304 may include indicia (such as "pull here" or the like) indicating how to remove the tabs 304 from the battery 602. In this manner, the battery retention label 300 secures the battery 602 within the user device 100, while also enabling the battery 602 to be easily removed from the user device 100 with the application of a tensile force to the tabs 304.

Illustrative Methods

Figure 11:
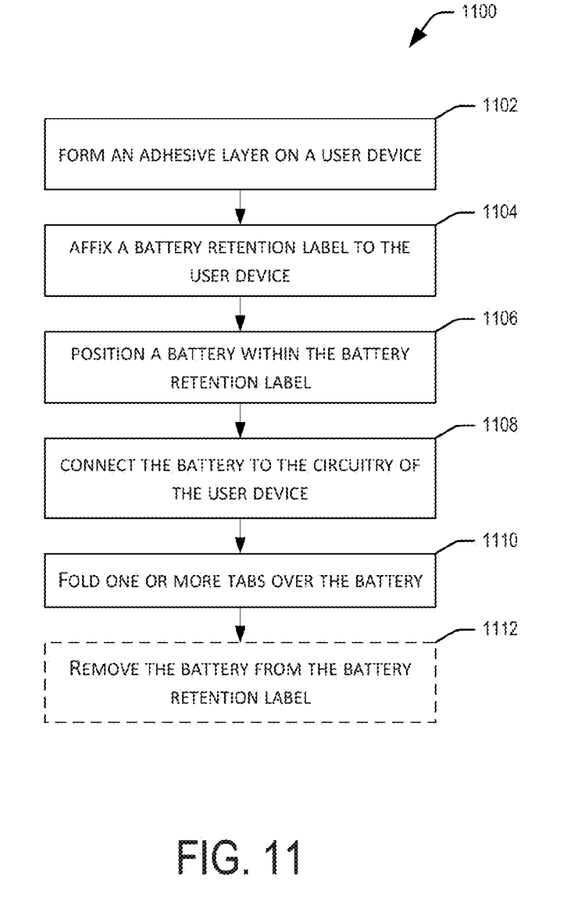
FIG. 11 is a flow diagram depicting an illustrative method for removably attaching a battery to a user device in accordance with one or more embodiments of the disclosure.

FIG. 11 is a flow diagram depicting an illustrative method 1100 for removably attaching the battery 602 to the user device 100 in accordance with one or more embodiments of the disclosure.

At block 1102 of method 1100, an adhesive layer 108 may be formed on the user device 100. That is, in certain embodiments, the adhesive layer 108 may be disposed on all or some of the inner portion 102 of the user device 100. For example, the adhesive layer 108 may be formed on the inner surface 104 of the back cover 106 of the user device 100. The adhesive layer 108 may be disposed on the inner surface 104 in any number of configurations. In other instances, the adhesive layer 108 may be formed on the battery retention label instead of or in addition to the inner portion 102 of the user device 100. That is, the adhesive layer 108 may be formed on the inner portion 102 of the user device 100 and/or on the body portion 302 of the battery retention label 300. The thickness and/or area covered by the adhesive layer 108 may vary depending on the properties (e.g., strength) of the adhesive layer 108 and/or the size of the battery 602. In some instances, a peelable protective cover 202 may be positioned in overlying relation to the adhesive layer 108.

Upon providing the adhesive layer 108 at block 1102, the battery retention label 300 may be affixed to the user device 100 at block 1104. For example, the peelable protective cover 202 may be removed (i.e., peeled away) from the adhesive layer 108 to expose the adhesive layer 108 thereunder, and the battery retention label 300 may be affixed to the adhesive layer 108. In certain embodiments, the battery retention label 300 may include a body portion 302. Although not required, the size and shape of the body portion 302 may at least partially correspond to the size and shape of the adhesive layer 108 on the inner surface 104 of the back cover 106 of the user device 100. In other instances, the adhesive layer 108 may be formed on the body portion 302 of the battery retention label 300. In this manner, the body portion 302 may be affixed to the inner portion 102 of the user device 100 by the adhesive layer 108.

After the battery retention label 300 has been adhered to the user device 100 at block 1104, the battery 602 may be positioned within the battery retention label 300 at block 1106. For example, in certain aspects, the body portion 302 of the battery retention label 300 opposite the adhesive layer 108 may be configured to receive the battery 602 thereon. That is, the battery 602 may be positioned on or about the body portion 302 after it has been adhered to the inner portion 102 of the user device 100. The body portion 302 of the battery retention label 300 may form a layer (or barrier) between the adhesive layer 108 and the battery 602. Thus, the battery 602 may not be directly affixed to the inner portion 102 of the user device 100.

At block 1108 of method 1100, the battery 602 may be connected to the circuitry 702 of the user device 100. For example, after the battery 602 has been positioned on the body portion 302 of the battery retention label 300, the battery 602 may be connected to the circuitry 702 of the user device 100 by way of, for example, a board-to-board connector or the like. Because the battery 602 is not yet fastened within the user device 100 when the battery 602 is connected to the circuitry 702, the battery 602 is capable of self-adjusting its position about the battery retention label 300 so that it is in the proper position and within acceptable tolerances to form a lasting connection with the circuitry 702. This enables the battery 602 to be positioned (and/or repositioned) within the user device 100 without being initially adhered to the user device 100.

At block 1110 of method 1100, the tabs 304 of the battery retention label 300 may be folded over the battery 602. For example, each of the tabs may include a battery adhesive layer 306 on one side thereof. Further, a peelable protective cover 308 may be positioned in overlying relation to the battery adhesive layer 306. In this manner, the peelable protective cover 308 may be removed from the tabs 304, and the tabs 304 may be folded over the battery 602 opposite the body portion 302 so that the battery adhesive layer 306 adheres to the outer surface of the battery 602. In other instances, the tabs 304 may be folded over one another in overlying relation. As a result, the battery 602 may be retained within the battery retention label 300, which in turn may be affixed to the inner surface 104 of the back cover 106 of the user device 100.

In some instances, the battery 602 may be removed from the battery retention label 300 at block 1112 of method 1100. This step is optional. For example, if the user device 100 is returned, the battery 602 may be removed and replaced. The tabs 304 may be removed from the battery 602 by the application of a tensile force. For example, a tensile force may be applied to the tabs 304 to lift (or peel) the tabs 304 away from the battery 602. Once the tabs 304 are no longer adhered to the battery 602, the battery 602 may be removed from the battery retention label 300.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system for removably attaching a battery to an inner portion of a user device, the system comprising:
    an adhesive layer disposed on the inner portion of the user device; and
    a battery retention label configured to be affixed to the inner portion of the user device by the adhesive layer, the battery retention label comprising:
        a body portion configured to be affixed to the inner portion of the user device by the adhesive layer, wherein when the battery is positioned on the body portion, the body portion forms a barrier between the adhesive layer and the battery; and
        one or more tabs extending from the body portion, wherein at least one of the one or more tabs comprises a battery adhesive layer formed on at least one side thereof, and wherein the at least one of the one or more tabs is configured to be folded over the battery so that the battery adhesive layer adheres to the battery and attaches the battery to the battery retention label.

2. The system of claim 1, wherein the battery adhesive layer comprises a greater resistance to a shear force than to a tensile force.

3. The system of claim 1, further comprising
    a first removable protective cover positioned in overlying relation to the adhesive layer; and
    a second removable protective cover positioned in overlying relation to the battery adhesive layer.

4. The system of claim 1, further comprising:
    at least one alignment member integrally formed with the body portion of the battery retention label, wherein the at least one alignment member is configured to cooperate with the inner portion of the user device to align the battery retention label within the user device.

5. The system of claim 1, further comprising a pull tab integrally formed with the at least one of the one or more tabs for removing the at least one of the one or more tabs from the battery.

6. A battery retention label for removably attaching a battery to an inner portion of a user device, the battery retention label comprising:
    a body portion configured to be affixed to the inner portion of the user device; and
    one or more tabs extending from the body portion, wherein at least one of the one or more tabs is configured to be removably affixed to the battery for attaching the battery to the battery retention label.

7. The battery retention label of claim 6, further comprising an adhesive layer disposed on the inner portion of the user device, wherein the adhesive layer is configured to affix the body portion to the inner portion of the user device.

8. The battery retention label of claim 6, further comprising an adhesive layer disposed on the body portion of the battery retention label, wherein the adhesive layer is configured to affix the body portion to the inner portion of the user device.

9. The battery retention label of claim 7, further comprising a removable protective cover positioned in overlying relation to the adhesive layer.

10. The battery retention label of claim 6, further comprising a battery adhesive layer formed on the at least one of the one or more tabs, wherein the battery adhesive layer is configured to affix the at least one of the one or more tabs to the battery.

11. The battery retention label of claim 10, wherein the battery adhesive layer comprises a greater resistance to a shear force than to a tensile force.

12. The battery retention label of claim 10, further comprising a removable protective cover positioned in overlying relation to the battery adhesive layer.

13. The battery retention label of claim 10, wherein the battery adhesive layer comprises an acrylic.

14. The battery retention label of claim 6, further comprising one or more alignment members integrally formed with the body portion, wherein the one or more alignment members are configured to align the battery retention label within the user device.

15. The battery retention label of claim 6, further comprising a pull tab integrally formed with the at least one of the one or more tabs for removing the at least one of the one or more tabs from the battery.

16. A battery retention device for removably attaching a battery to an inner portion of a user device, the battery retention device comprising:
one or more tabs affixed to the inner portion of the user device; and
a battery adhesive layer formed on at least one side of at least one of the one or more tabs, wherein the at least one of the one or more tabs is configured to be folded over the battery so that the battery adhesive layer adheres to the battery for attaching the battery to the user device.

17. The battery retention device of claim 16, wherein the battery adhesive layer comprises a greater resistance to a shear force than to a tensile force.

18. The battery retention device of claim 16, further comprising a removable protective cover positioned in overlying relation to the battery adhesive layer.

19. The battery retention device of claim 16, further comprising a pull tab integrally formed with the at least one of the one or more tabs for removing the at least one of the one or more tabs from the battery.

20. A method for removably attaching a battery to an inner portion of a user device, comprising:
affixing a battery retention label to the inner portion of the user device, wherein the battery retention label comprises a body portion and one or more tabs extending from the body portion;
positioning the battery on the battery retention label; and
folding at least one of the one or more tabs over the battery, wherein the at least one of the one or more tabs comprises a battery adhesive layer formed on at least one side thereof so that the battery adhesive layer adheres to the battery and attaches the battery to the battery retention label.

21. The method of claim 20, further comprising applying an adhesive layer to the inner portion of the user device, wherein the battery retention label is affixed to the inner portion of the user device by the adhesive layer.

22. The method of claim 20, further comprising applying an adhesive layer to the body portion of the battery retention label, wherein the battery retention label is affixed to the inner portion of the user device by the adhesive layer.

23. The method of claim 21, further comprising removing a protective cover from of the adhesive layer.

24. The method of claim 20, further comprising removing a protective cover from of the battery adhesive layer.

25. The method of claim 20, further comprising forming an electrical connection between the battery and the user device.

26. The method of claim 20, further comprising aligning the battery retention label within the user device.

27. The method of claim 20, further comprising applying a tensile force to the at least one the one or more tabs to remove the battery from the battery retention label.

\* \* \* \* \*